Jan. 22, 1963

W. W. BOYLE 3,075,093

EXCLUSIVE OR CIRCUIT USING NOR LOGIC

Filed Dec. 19, 1960

*INVENTOR.*

WILLIAM W. BOYLE

*BY* Edward G. Fiorito

AGENT

United States Patent Office 3,075,093
Patented Jan. 22, 1963

3,075,093

EXCLUSIVE OR CIRCUIT USING NOR LOGIC

William W. Boyle, La Grangeville, N.Y., assignor to International Business Machines Corporation, New York, N.Y., a corporation of New York Filed Dec. 19, 1960, Ser. No. 76,641
1 Claim. (Cl. 307—88.5)

This invention relates to apparatus for performing logical operations upon binary signals, and more particularly, to such apparatus composed of interconnected logical circuit elements.

The fundamental logical circuit elements in digital computer apparatus has been the AND, OR, and NOT circuits. Each of these circuits performs a different type of logical operation. In the past it has been necessary to use a combination of these or other logical circuit elements in order to construct digital computing apparatus such as an Exclusive OR circuit, or a Full Adder and Subtractor circuit.

The present invention is directed to digital computing apparatus capable of performing the Exclusive OR operation using only a single type of logical circuit element, called the NOR circuit. More efficient construction and servicing of the apparatus can be achieved by utilizing only a single circuit element. Where there is a plurality of types of circuit elements, problems arise in attempting to locate the proper type of circuit elements adjacent to each other so that the interconnections are minimized. Also in servicing such a computer each of the various types of circuit elements must be stored in order to have replacement parts available.

It is an object of the present invention to provide an improved Exclusive OR circuit using only a single type of logical circuit element.

It is a further object of this invention to provide an Exclusive OR circuit containing a minimum number of such circuit elements.

Still another object is to provide an improved Exclusive OR circuit capable of rapid operation.

The foregoing and other objects, features and advantages of the invention will be apparent from the following more particular description of preferred embodiments of the invention, as illustrated in the accompanying drawings.

Figure 1:
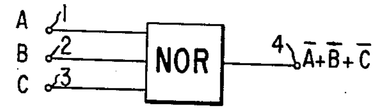
FIG. 1 is a block diagram of a NOR circuit used in the invention.
Figure 5:
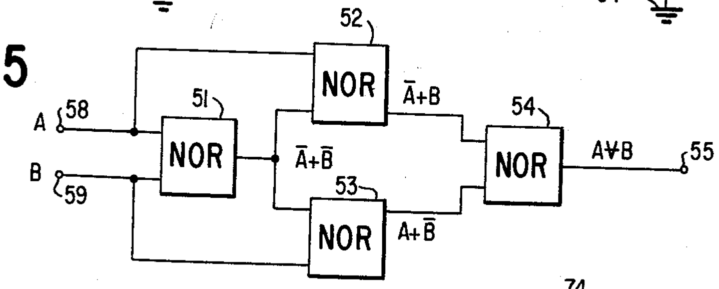
FIG. 5 is a schematic diagram of an Exclusive OR circuit embodying the invention.
Figure 6:
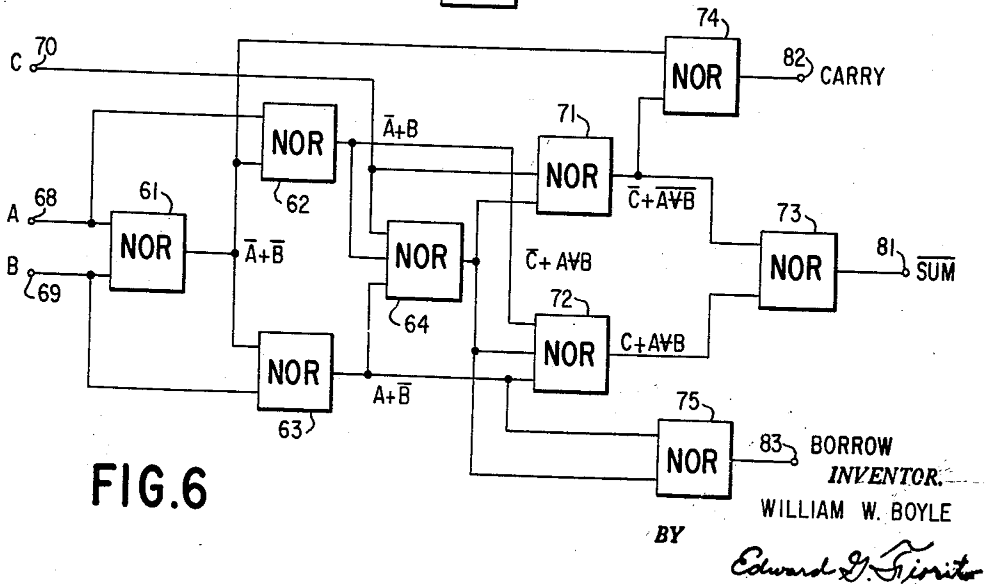
FIG. 6 is a schematic diagram of a Full Adder and Subtractor circuit embodying the invention.

The circuit element shown in FIG. 1, called a NOR circuit, is the only circuit element used to construct the Exclusive OR circuit shown in FIG. 5, and the Full Adder and Subtractor circuit shown in FIG. 6. This Exclusive OR circuit may be used in digital computers when their operation calls for an output signal when only one of two binary input signals is present. The Full Adder and Subtractor circuit of FIG. 6 can be used in any computer where the operation calls for either the addition of two binary digits and a carry from the previous binary digit position, or the subtraction of two binary digits and a borrow from the previous binary digit position. This Full Adder and Subtractor circuit is capable of providing a signal representing the sum or difference, and signals representing the carry and borrow functions of three binary input signals.

FIG. 1 illustrates the logical operation of a NOR circuit. Three binary signals A, B, and C are applied to the input terminals, 1, 2, and 3, respectively. An output is present on terminal 4 when A is not present, or B is not present, or C is not present. This statement of the output on terminal 4 is expressed in the language of Boolean algebra in FIG. 1 at the terminal 4. The removal or addition of an input results in the removal or addition of a corresponding term in this Boolean expression.

Figure 2:
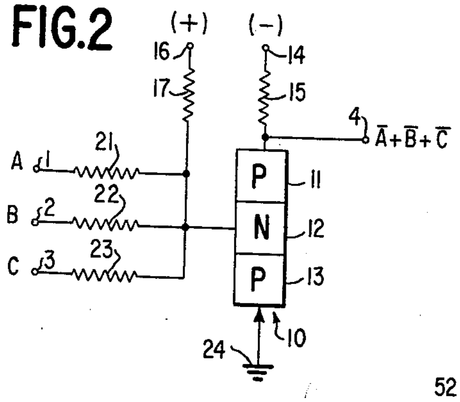
FIG. 2 illustrates a preferred embodiment of the circuitry suitable for performing the logical operation of the NOR circuit shown in FIG. 1.

In FIG. 2 a preferred circuit is shown for carrying out the operation of the NOR circuit shown in FIG. 1. A PNP transistor 10 of the junction type is shown having a collector 11, a base 12, and an emitter 13. The collector 11 is biased by the negative voltage supply on terminal 14 through resistor 15. The base 12 is biased by the positive voltage supply on terminal 16 through resistor 17 so that the transistor is not conducting when no signals are connected to the terminals 1–3. Resistors 21–23 are designed so that a negative signal applied to any one or more of the terminals 1–3 causes the transistor 10 to conduct. When the transistor 10 conducts, the output terminal 4 approaches the voltage level of ground 24 connected to the emitter 13. If all of the signals applied to the terminals 1–3 are positive the transistor 10 does not conduct and the voltage level on the output terminal 4 drops approximately to the level of the negative voltage supply on terminal 14.

Referring to FIG. 2, if the presence of the binary signal A is represented by a positive voltage level on terminal 1, and the output on terminal 4 is considered to be present when the more positive voltage level of the ground 24 is approached, the Boolean expression at the output terminal is a statement of when this more positive level is present as a function of the signals applied to the terminals 1–3. For example, if the binary signal A is absent, a negative signal is present on the terminal 1 causing the transistor 10 to conduct. The voltage on output terminal 4 approaches the more positive level of ground 24 which represents the presence of an output. Thus, the first term of the Boolean expression at terminal 4 is $\overline{A}$, which in Boolean language means an output is present on terminal 4 when the binary signal A is not present on terminal 1. In a like manner, it can be seen that, when the binary signal B is not present there will be an output, or when the binary signal C is not present there will be an output.

The proper value of resistors and potential sources in FIG. 2 can be chosen so that the output on terminal 4 may be connected to one or more of the input terminals 1–3 of another NOR circuit. A series of NOR circuits can be connected together in this manner to construct digital computing apparatus. The NOR circuit of FIG. 1 is called the Stroke function NOR circuit and will be referred to as such.

Figure 3:
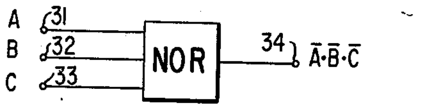
FIG. 3 is a block diagram of another NOR circuit capable of use in the invention.

Shown in FIG. 3 is another NOR circuit capable of implementing the circuits in FIGS. 5 and 6. This NOR circuit performs a slightly different operation and is called the Dagger function NOR circuit. Three binary signals A, B, and C are shown applied to the terminals 31–33 respectively of the Dagger function NOR circuit in FIG. 3. The Boolean expression at the output terminal 34 is an algebraic statement of when this output is present as a function of the three binary signals on terminals 31–33. The output is present on terminal 34 only when the binary signal A is not present and B is not present and C is not present. One or more inputs may be added or removed, resulting in the removal or addition of a corresponding term in the Boolean expression at terminal 34.

The Dagger function NOR circuit shown in FIG. 3 is the dual of the Stroke function NOR circuit shown in FIG. 1. That is, by applying the complement of the binary signals A, B, and C to the terminals 31–33, an output is generated on terminal 34, which is the complement of the signal generated on terminal 4 when the true form of the binary signals are applied to terminals 1–3. This may be illustrated as follows:

Dagger function NOR circuit FIG. 3 inputs: $\bar{A}$; $\bar{B}$; $\bar{C}$ output: $\bar{\bar{A}}\cdot\bar{\bar{B}}\cdot\bar{\bar{C}}=A\cdot B\cdot C=\overline{\bar{A}+\bar{B}+\bar{C}}=$ $\underline{\text{Stroke Function NOR Circuit Output}}$ It may also be shown that the stroke function NOR circuit in FIG. 1 is the dual of the Dagger function NOR circuit shown in FIG. 3 as follows:

Stroke function NOR circuit FIG. 1 inputs: $\bar{A}$; $\bar{B}$; $\bar{C}$ output: $\bar{\bar{A}}+\bar{\bar{B}}+\bar{\bar{C}}=A+B+C=\overline{\bar{A}\cdot\bar{B}\cdot\bar{C}}=$ $\underline{\text{Dagger function NOR circuit output}}$ As will be described later in more detail this duality of the Stroke and Dagger function enables the circuits of FIG. 5 and FIG. 6 to be implemented in either one of these NOR circuits.

Figure 4:
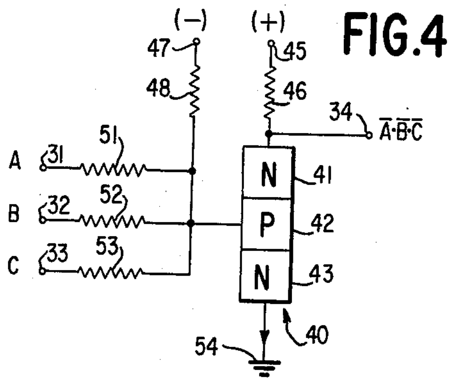
FIG. 4 illustrates a preferred embodiment of the circuitry suitable for performing the logical operation of the NOR circuit shown in FIG. 3.

In FIG. 4, a preferred circuit is shown capable of performing the operation of the Dagger function NOR circuit shown in FIG. 3. The NPN transistor 40 is of the junction type and has a collector 41, a base 42, and an emitter 43. A positive voltage supply on terminal 45 supplies the bias to collector 41 through resistor 46. The base 42 is biased by the negative potential on terminal 47 through the resistor 48, so that when no signals are connected to the terminals 31–33, the transistor is not conducting. The resistors 51–53 are designed so that, when a positive signal is applied to any one or more of the terminals 31–33, the transistor 40 is caused to conduct. When the transistor 40 is conducting, the voltage on terminal 34 approaches the voltage level of the ground 54 connected to the emitter 43. When the transistor 40 is not conducting, the voltage on terminal 34 approaches the potential of the positive voltage supply on terminal 45. The voltage on terminal 34 is positive only if all of the voltages on terminals 31–33 are negative. The Boolean expression at the output terminal 34 in FIG. 4 is an algebraic statement of the presence and absence of the signal on terminal 34. The presence of the binary signals A, B, and C is represented by a positive voltage. The resistors and potential sources in FIG. 4 can be designed so that several stages of NOR circuits can operate with their inputs and outputs coupled together. As in the case of the Stroke function NOR circuit, a series of Dagger function NOR circuits may be connected together to construct digital computing apparatus.

In FIG. 5 all of the NOR circuits have two inputs and a single output and each performs the logical operation shown in FIG. 1. Binary signals A and B are applied to terminals 58 and 59 respectively. The Boolean expressions at the output of NOR circuits 51–54 are an algebraic statement of the presence and absence of these outputs as a function of the presence and absence of the binary input signals A and B. The interconnections are carefully selected so that a minimum number of NOR circuits are used to form the Exclusive OR function at terminal 55. The Boolean expressions at the output of NOR circuits 52–54 may be derived using the basic principles of Boolean algebra as taught in the text Arithmetic Operations In Digital Computers by R. K. Richards, D. Van Nostrand Company, Inc., in the following manner:

NOR circuit 52 inputs: A; $\bar{A}+\bar{B}$ output: $\bar{A}+\overline{\bar{A}+\bar{B}}=\bar{A}+A\cdot B=\bar{A}+B$ NOR circuit 53 inputs: $\bar{A}+\bar{B}$; B output: $\overline{\bar{A}+\bar{B}}+\bar{B}=A\cdot B+\bar{B}=A+\bar{B}$ NOR circuit 54 inputs: $\bar{A}+B$; $A+\bar{B}$ output: $\overline{\bar{A}+B}+\overline{A+\bar{B}}=A\cdot\bar{B}+\bar{A}\cdot B=A\veebar B$ The Exclusive OR circuit in FIG. 5 is included in the circuit of FIG. 6 by NOR circuits 61–64 along with their interconnections. Additional NOR circuits 71–75 are added to complete the Full Adder and Subtractor operation.

Referring to FIG. 6, where the circuit is to perform the Full Adder operation only, NOR circuit 75 is not required. The binary signals A and B representing the digits to be added are applied to the terminals 68 and 69 respectively. The binary signal C representing the Carry function from the next lower binary digit position is applied to the terminal 70. The NOR circuits 61–64 operate in the identical manner described in connection with the Exclusive OR circuit, FIG. 5. The addition of the Carry signal C to NOR circuit 64 causes the additional term in the Boolean expression at the output of NOR circuit 64. Each of the outputs from NOR circuits 61–64 are utilized by the additional NOR circuits 71–75 in order to generate the Sum and Carry functions. The Boolean expression at the output of NOR circuits 71 and 72 may be derived as follows:

NOR circuit 71 inputs: C; $\bar{C}+A\veebar B$ output: $\bar{C}+\overline{\bar{C}+A\veebar B}=\bar{C}+C\cdot\overline{A\veebar B}=\bar{C}+\overline{A\veebar B}$ NOR circuit 72 inputs: $\bar{A}+B$; $\bar{C}+A\veebar B$; $A+\bar{B}$ output: $\overline{\bar{A}+B}+\overline{\bar{C}+A\veebar B}+\overline{A+\bar{B}}=C\cdot\overline{A\veebar B}+A\cdot\bar{B}+\bar{A}\cdot B=$ $C\cdot\overline{A\veebar B}+A\veebar B=C+A\veebar B$ The inputs of the Sum NOR circuit 73 are chosen so that the complement of the Sum function for the three binary signals A, B, and C, is generated on terminal 81. The Boolean expression for the output of Sum NOR circuit 73 may be derived as follows:

Sum NOR circuit 73 inputs: $\bar{C}+\overline{A\veebar B}$; $C+A\veebar B$ output: $\overline{\bar{C}+\overline{A\veebar B}}+\overline{C+A\veebar B}=\overline{(\bar{C}+\overline{A\veebar B})\cdot(C+A\veebar B)}=$ $\overline{C\cdot\overline{A\veebar B}+\bar{C}\cdot A\veebar B}=\overline{SUM}$ The inputs to Carry NOR circuit 74 are chosen so that the Carry function of the three binary signal inputs is generated on terminal 82. The Boolean expression for the Carry NOR circuit 74 may be derived as follows:

Carry NOR circuit 74 inputs: $\bar{A}+\bar{B}$; $\bar{C}+\overline{A\veebar B}$ output: $\overline{\bar{A}+\bar{B}}+\overline{\bar{C}+\overline{A\veebar B}}=A\cdot B+C\cdot A\veebar B=$ $A\cdot B+C\cdot A\cdot\bar{B}+C\cdot\bar{A}\cdot B=A\cdot B+C\cdot A+C\cdot B=$ CARRY Where the circuit shown in FIG. 6 is to perform the Full Subtractor operation only, NOR circuit 74 is not required. Here the binary signals A and B represent the digits to be subtracted; B is subtracted from A. The binary signal C represents the Borrow function from the next lower binary digit position. The output from the Sum NOR circuit 73 now represents the Difference function for the three binary signals. No change in connections is needed since the Boolean expression for the Sum function and the Difference function is the same. The inputs to the Borrow NOR circuit 75 are chosen so that the output on terminal 83 represents the Borrow function for the three binary signal inputs. The Boolean expression for the output of the Borrow NOR circuit 75 may be derived as follows:

Borrow NOR circuit 75 inputs: $A+\bar{B}$; $\bar{C}+A\veebar B$ output: $\overline{A+\bar{B}+\bar{C}+A\veebar B}=\bar{A}\cdot B+C\cdot\overline{A\veebar B}=\bar{A}\cdot B+C\cdot A\cdot B+C\cdot\bar{A}\cdot\bar{B}=BORROW$ Both the Carry NOR circuit 74 and the Borrow NOR circuit 75 can remain in the circuit of FIG. 6 without interfering with operation of the other. Another advantageous feature of this Full Adder and Subtractor circuit is that the Carry or Borrow input signal on terminal 70 propagates through only two stages of NOR circuits before arriving at the output of the Carry NOR circuit 74 or Borrow NOR circuit 75. This allows a more rapid operation of the computer apparatus and is especially advantageous where a number of such Full Adder and Subtractor circuits are operated in parallel, one for each binary digit position. In this case, the Carry or Borrow signal must propagate through a plurality of such circuits as shown in FIG. 6. The number of stages of NOR circuits that this signal must propagate through within each Full Adder and Subtractor directly affects the total time of propagation through the entire array of binary digit positions.

The Exclusive OR circuit shown in FIG. 5 can be implemented by using the Dagger function NOR circuit in FIG. 3. For this implementation, the complement of the binary signals A and B are applied to the terminals 58 and 59 and the complement of the Exclusive OR function is generated at terminal 55. This may be shown by deriving the Boolean expressions for the outputs of each NOR circuits 51–54 as follows:

NOR circuit 51 inputs: $\bar{A}$; $\bar{B}$ output: $\bar{\bar{A}}\cdot\bar{\bar{B}}=A\cdot B$

NOR circuit 52 inputs: $\bar{A}$; $A\cdot B$ output: $\bar{\bar{A}}\cdot\overline{A\cdot B}=A\cdot(\bar{A}+\bar{B})=A\cdot\bar{B}$ NOR circuit 53 inputs: $A\cdot B$; $\bar{B}$ output: $\overline{A\cdot B}\cdot\bar{\bar{B}}=(\bar{A}+\bar{B})\cdot B=\bar{A}\cdot B$ NOR circuit 54 inputs: $A\cdot\bar{B}$; $\bar{A}\cdot B$ output: $\overline{A\cdot\bar{B}}\cdot\overline{\bar{A}\cdot B}=\overline{A\cdot\bar{B}+\bar{A}\cdot B}=\overline{A\veebar B}$ The Full Adder and Subtractor circuit of FIG. 6 can be implemented using the Dagger function NOR circuit of FIG. 3 by applying the complement of the signals A, B, and C to the terminals 68–70. The complement of the functions shown at the terminals 81–83 is generated. The Boolean expressions for the outputs of NOR circuits 64 and 71–75 may be derived as follows:

NOR circuit 64 inputs: C; $A\cdot\bar{B}$; $\bar{A}\cdot B$ output: $\bar{\bar{C}}\cdot\overline{A\cdot\bar{B}}\cdot\overline{\bar{A}\cdot B}=C\cdot\overline{(A\cdot\bar{B}+\bar{A}\cdot B)}=C\cdot\overline{A\veebar B}$ NOR circuit 71 inputs: $\bar{C}$; $C\cdot\overline{A\veebar B}$ output: $\bar{\bar{C}}\cdot\overline{C\cdot\overline{A\veebar B}}=\overline{\bar{C}+C\cdot\overline{A\veebar B}}=\overline{\bar{C}+\overline{A\veebar B}}$ NOR circuit 72 inputs: $A\cdot\bar{B}$; $C\cdot\overline{A\veebar B}$; $\bar{A}\cdot B$ output: $\overline{A\cdot\bar{B}}\cdot\overline{C\cdot\overline{A\veebar B}}\cdot\overline{\bar{A}\cdot B}=\overline{C\cdot\overline{A\veebar B}}\cdot\overline{(A\cdot\bar{B}+\bar{A}\cdot B)}=\overline{C\cdot\overline{A\veebar B}}\cdot\overline{A\veebar B}=\overline{C\cdot\overline{A\veebar B}+A\veebar B}=\overline{C+A\veebar B}$ Sum NOR circuit 73 inputs: $\bar{C}+\overline{A\veebar B}$; $\overline{C+A\veebar B}$ output: $\overline{\bar{C}+\overline{A\veebar B}}\cdot\overline{\overline{C+A\veebar B}}=\overline{(\bar{C}+\overline{A\veebar B})}\cdot(C+A\veebar B)=\bar{C}\cdot C+C\cdot\overline{A\veebar B}+\bar{C}\cdot A\veebar B+\overline{A\veebar B}\cdot A\veebar B=C\cdot\overline{A\veebar B}+\bar{C}\cdot A\veebar B=SUM$ Carry NOR circuit 74 inputs: $A\cdot B$; $\overline{\bar{C}+\overline{A\veebar B}}$ output: $\overline{A\cdot B}\cdot\overline{\overline{\bar{C}+\overline{A\veebar B}}}=\overline{A\cdot B+\overline{\bar{C}+\overline{A\veebar B}}}=\overline{A\cdot B+C\cdot A\veebar B}=\overline{A\cdot B+C\cdot A+C\cdot B}=\overline{Carry}$ Borrow NOR circuit 75 inputs: $\bar{A}\cdot B$; $C\cdot\overline{A\veebar B}$ output: $\overline{\bar{A}\cdot B}\cdot\overline{C\cdot\overline{A\veebar B}}=\overline{\bar{A}\cdot B+C\cdot\overline{A\veebar B}}=\overline{\bar{A}\cdot B+C\cdot A\cdot B+C\cdot\bar{A}\cdot\bar{B}}=\overline{Borrow}$ Since the complement of the binary signals are as readily available as the true form of the binary signals in most digital computers, the Dagger function implementation is as useful as the Stroke function implementation. Whether the Stroke function NOR circuit or the Dagger function NOR circuit is employed, the circuits as shown in FIGS. 5 and 6 operate successfully without any changes in interconnections.

While the invention has been particularly shown and described with reference to preferred embodiments thereof, it will be understood by those skilled in the art that various changes in form and details may be made therein without departing from the spirit and scope of the invention.

What is claimed is:

An Exclusive OR circuit capable of accepting two binary signals comprising: a first, a second, a third, and a fourth NOR circuit; and circuit means connecting said binary signals to said first NOR circuit, one of said binary signals to said second NOR circuit, and the other of said binary signals to said third NOR circuit, the output of said first NOR circuit to said second and third NOR circuits, and the output of said second and third NOR circuits to said fourth NOR circuit, whereby the output of said fourth NOR circuit represents the Exclusive OR function of said two binary signals.

References Cited in the file of this patent

UNITED STATES PATENTS

| | | |
|---|---|---|
| 2,815,913 | Lucas | Dec. 10, 1957 |
| 2,868,999 | Garfinkel et al. | Jan. 13, 1959 |
| 2,894,687 | Raymond et al. | July 14, 1959 |
| 2,901,637 | Wang | Aug. 25, 1959 |

OTHER REFERENCES

Greenhalgh: Exclusive "OR" Circuit, IBM Technical Disclosure Bulletin, volume 2, No. 6, April 1960, pp. 98 and 99.

Kellet: The Elliott Sheffer Stroke Static Switching System, Electronic Engineering (September 1960). (Page 537—Figure 15 relied on.)